United States Patent [19]
Redlich

[11] Patent Number: 4,642,547
[45] Date of Patent: Feb. 10, 1987

[54] ADAPTIVE REGULATION SYSTEM FOR A LINEAR ALTERNATOR DRIVEN BY A FREE-PISTON STIRLING ENGINE

[75] Inventor: Robert W. Redlich, Athens, Ohio
[73] Assignee: Sunpower, Inc., Athens, Ohio
[21] Appl. No.: 766,491
[22] Filed: Aug. 19, 1985
[51] Int. Cl.[4] ............... H02P 9/04; H02K 35/00; F02B 71/00
[52] U.S. Cl. ................ 322/3; 290/1 R; 310/15; 322/8; 322/93
[58] Field of Search ............ 322/3, 7, 8, 93; 310/15; 290/1 R

[56] References Cited

U.S. PATENT DOCUMENTS

| | | | |
|---|---|---|---|
| 3,063,002 | 11/1962 | Phelon | 322/93 X |
| 3,341,763 | 9/1967 | Noddin | 322/91 X |
| 4,219,768 | 8/1980 | Gobaud | 322/8 |
| 4,403,153 | 9/1983 | Vallon | 290/1 R |
| 4,433,279 | 2/1986 | Bhate | 310/15 X |

Primary Examiner—R. J. Hickey
Attorney, Agent, or Firm—Frank H. Foster

[57] ABSTRACT

A load regulator for a linear alternator driven by a free piston Stirling engine. A substantially constant output voltage is maintained across the useful load by shunting a portion of the armature output current of the alternator through a variable energy absorbing conductance and varying that conductance in proportion to changes in the output voltage of the alternator in order to maintain a constant total armature power output. The regulator may be made more efficient by forming the armature coil as a plurality of series connected coils by one or more taps and then switching the number of series coil turns in connection to the load approximately in inverse proportion to the square root of the steady state power demand of the load so that the total armature output power is switched between discrete levels while the output voltage is maintained constant for all those levels by the variable impedance.

11 Claims, 8 Drawing Figures

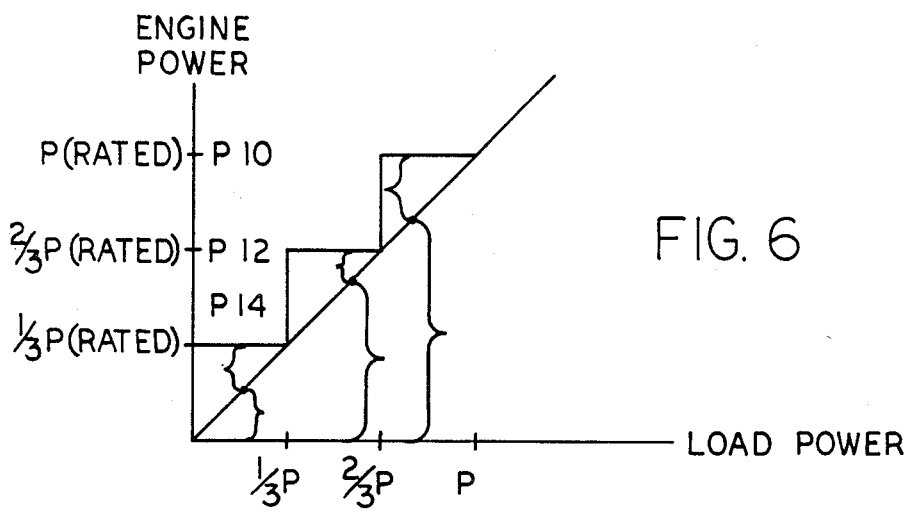
FIG. 6
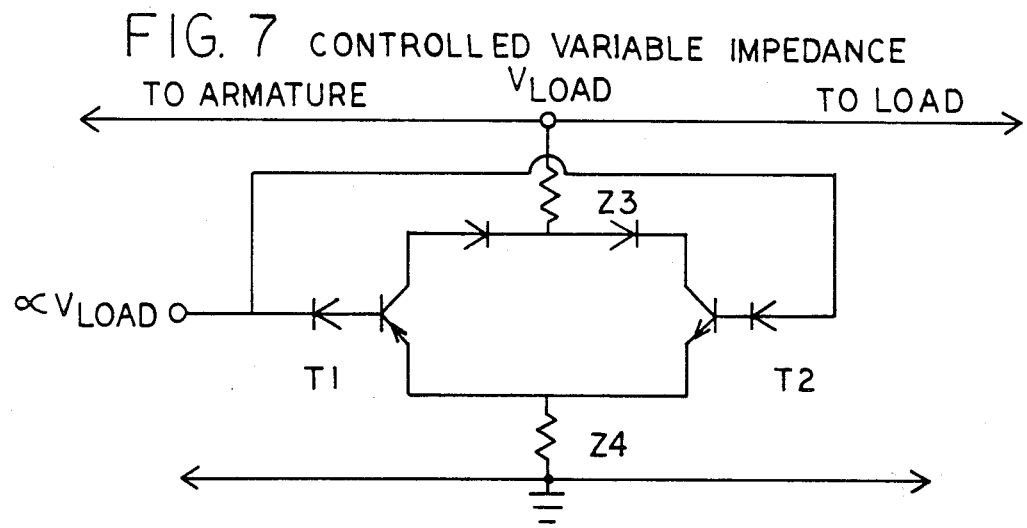
FIG. 7 CONTROLLED VARIABLE IMPEDANCE
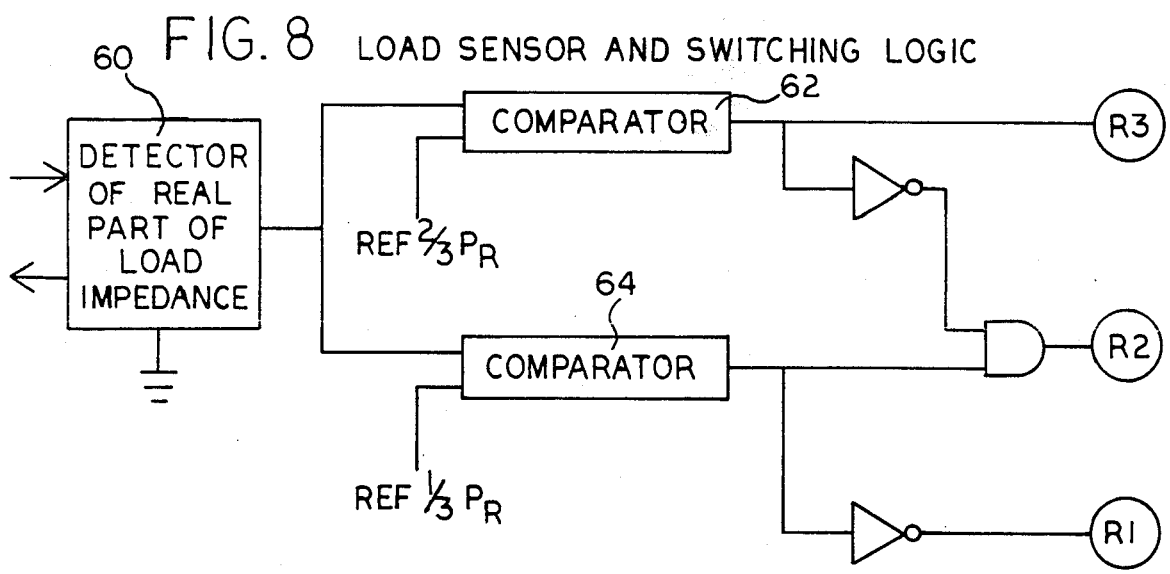
FIG. 8 LOAD SENSOR AND SWITCHING LOGIC

ADAPTIVE REGULATION SYSTEM FOR A LINEAR ALTERNATOR DRIVEN BY A FREE-PISTON STIRLING ENGINE

TECHNICAL FIELD

This invention relates generally to the generation of electrical energy from heat energy by means of a free piston Stirling engine driving a linear alternator. This invention more particularly relates to a regulation system for stabilizing the engine stroke amplitude and the output voltage as power demand, temperature and other operating parameters vary.

In the past, free piston Stirling engines have often been linked to drive linear alternators in reciprocating motion in order to generate electrical energy from heat energy by means of compact and efficient power generating units. In practical application of such units, the power demand of the electrical load often changes during normal operation due to variations in the load impedance and instantaneous connection or disconnection of all or part of the loads. In addition to such changes in power demand, the operating temperature of the Stirling engine, as well as other parameters, may vary. All of these parameters affect the operating equilibrium of this combination of a free piston Stirling engine and a linear alternator.

The mechanical power output from a free piston Stirling engine is proportional to the square of its stroke amplitude. In the alternator, the alternator output voltage is proportional to the stroke amplitude. Therefore, if the electrical energy demand changes, this would ordinarily result in a change in the engine stroke amplitude which would, in turn, result in a change in the armature output voltage. Changes in temperature and other parameters would also cause variations in stroke amplitude and therefore produce resulting variations in output voltage.

Not only is it desirable to maintain a relatively constant load voltage under all conditions of load and other parameters because most loads are designed to operate over a narrow range of voltage but also it is essential to maintain the stroke amplitude of the Stirling engine within safe limits. If the load upon a free piston Stirling engine is suddenly substantially reduced, then the stroke amplitude will be correspondingly substantially increased. If the stroke increase is sufficient, the piston and displacer, which are oscillating in reciprocation, will begin to strike the ends of their cylinders and/or each other causing physical damage to these parts which ultimately will be sufficient to destroy the Stirling engine. At the opposite extreme, if the loading is significantly increased, the stroke may be so substantially reduced that the free piston Stirling engine can no longer oscillate.

A prior art approach to the solution of these problems has been to mechanically drive the displacer of the free piston Stirling engine in its oscillating motion by means of a linear electric motor. The drive parameters, such as displacer stroke amplitude, are varied by a control system so that the displacer is driven in a manner to control the stroke of the piston of the free piston Stirling engine and the alternator output voltage.

This approach has been less than entirely satisfactory. First, it requires significant additional, electromechanical devices and control circuitry which make the problems of constructing a practical free piston Stirling engine that can operate under ordinary practical operating conditions considerably more complicated and difficult. Secondly, devices of that type suffer from a slow response time. Such a device is slow to respond to variations in electrical load because of the inertia of the mechanical parts which are being driven in reciprocation. Substantial time is necessary for the driven displacer to settle down and make a transition from one steady state operating condition to another. One result is that a sudden disconnection of the electrical load to the alternator of such a prior art system can produce physical damage to the Stirling engine piston and displacer before the prior art device can respond to that change and vary the displacer drive parameters.

Therefore, the problem exists to find a manner in which the output voltage of the alternator may be maintained essentially constant as the load demand, temperature and other operating parameters vary to thereby maintain the safe and preferably energy efficient operation of the free piston Stirling engine.

BRIEF DISCLOSURE OF INVENTION

The invention utilizes an "adaptive load" which is a controllably variable power absorber which is connected in parallel to the useful load and is controlled to draw more or less energy from the engine/alternator combination so that the output voltage remains at a selected design level. The system adapts to changes in the useful load or engine parameters such as temperature in the sense that it varies the energy absorption of the power absorber in order to maintain the output voltage at a selected design level. If engine parameters remain constant, constant voltage implies constant stroke and constant power output.

This is preferably accomplished by means of an active electronic circuit that is equivalent to a controllably variable resistance which is electrically connected in parallel to the useful load. The equivalent variable resistance value is controlled by a feedback circuit which includes a voltage detector which detects the output voltage. The feedback circuit has a reference signal and varies the conductance of load presented by the equivalent variable resistance in inverse proportion to changes in output voltage from a selected nominal or design voltage. The result is that the engine runs at essentially constant stroke and power output over a wide range of useful load power. This relatively constant power divides between useful power and adaptive load power.

Because the above improvement, when used alone, results in the operation of the engine/alternator at a substantially constant armature output power, it becomes relatively inefficient when the useful load power demand is significantly diminished. It can be made considerably more efficient by the further improvement of a stepped armature winding and control in accordance with the present invention. Because power is proportional to the square of the stroke and the voltage is proportional to the product of stroke amplitude multiplied by the number of armature windings, the regulator system is improved by forming the armature as a coil divided into a plurality of coils serially connected by one or more taps. This allows a control circuit to sense a decrease in the steady state useful load power demand and effectively switch more armature turns into the armature thereby reducing the engine stroke at which the nominal output voltage of the adaptive load is achieved, which in turn reduces the engine's mechanical output power.

Therefore, the invention further contemplates connecting the load to one of a plurality of armature taps, each of which corresponds to a selected one of a plurality of engine output operating power levels which range from relatively low power to maximum load power, the operative power level being that which encompasses the useful load power. After the armature is stepped to one of the selected power levels, the adaptive load regulator varies its load energy absorption as the energy absorbed by the useful load varies so that the total armature power output remains at the selected step or level. Therefore, each selected armature output power level and its corresponding number of armature turns can service a range of useful load power demand.

In practicing the method of the invention with the adaptive load embodiment, a proportion of the armature output current is shunted through a variable conductance and the conductance is varied in proportion to small changes in the output voltage of the alternator from a selected or nominal output voltage. This method is further enhanced and made more efficient by forming the armature coil as a plurality of coils, series connected by one or more taps, and switching a number of the series coils in connection to the load so that the total number of active armature turns is approximately in inverse proportion to the square root of the steady state power demand of the load.

The principal advantage of the present invention is that it stabilizes both the output voltage of the alternator and the stroke of the engine to maintain it within safe limits while at the same time allowing energy consumption by the free piston Stirling engine to be reduced under reduced useful load demand.

A further advantage is that the variable adaptive load has a relatively fast response time because it does not utilize energy storage devices such as reciprocating mechanical parts or inductors or capacitors.

Yet another important advantage is the relative simplicity and low cost of the component parts utilized in embodiments of the invention.

BRIEF DESCRIPTION OF DRAWINGS

FIGS. 4, 5 and 6 are graphs illustrating the operation of the embodiment illustrated in FIG. 3.

FIG. 7 is a schematic diagram of a controlled variable impedance for use in the adaptive regulator illustrated in FIGS. 1 or 3.

FIG. 8 is a schematic diagram of more details of the load sensor and switching logic portion of the circuit illustrated in FIG. 3.

Figure 1:
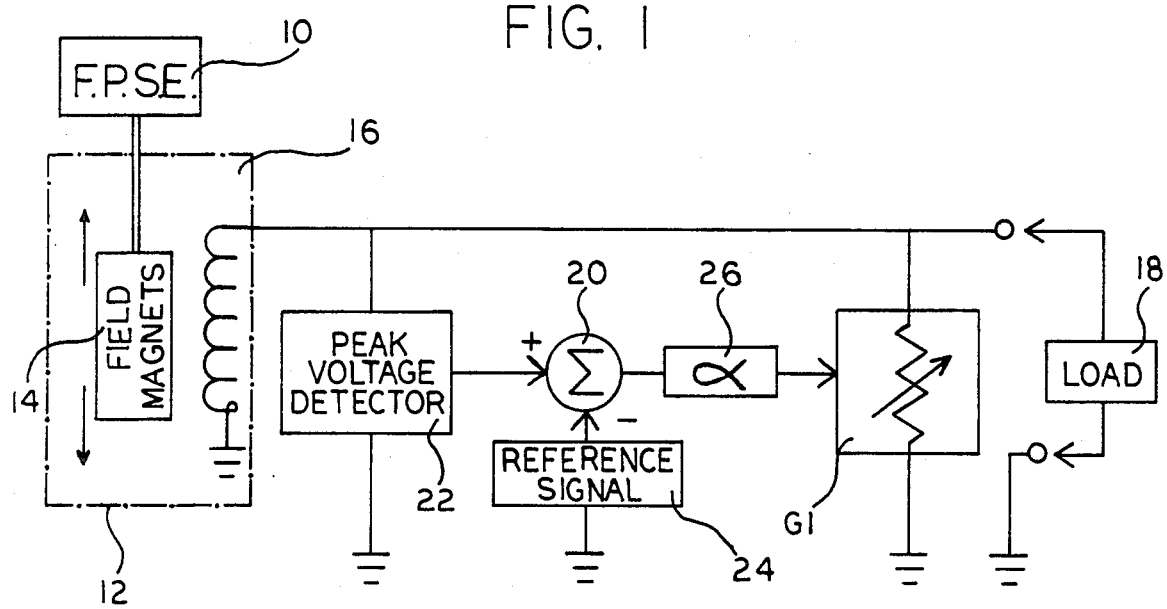
FIG. 1 is a schematic block diagram of a preferred embodiment of the adaptive load regulator of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

FIG. 1 illustrates a free piston Stirling engine 10 mechanically linked to drive an alternator 12 which incudes field magnets 14 which are driven in reciprocation by the engine 10. The alternator 12 has an armature circuit 16 which includes a conventional, series compensating capacitor and which is connected to a useful load 18. The free piston Stirling engine, its heat energy source and the alternator, as above described, may be of the conventional type previously known in the art.

The invention as illustrated in FIG. 1 has a controllably variable conductance $G1$ which is shunted across the armature 16 parallel to the useful load 18. The conductance $G1$ is preferably an electronic circuit equivalent to a variable resistive load, having a variable conductance which is varied and controlled by a feedback control circuit. The variable conductance $G1$ may, for example, consist of the simple circuit illustrated in FIG. 7 in which the impedance $Z3$ and the emitter impedance $Z4$ are series connected by transistors $T1$ and $T2$ to form the variable load. The effective impedance of the transistors $T1$ and $T2$ is controlled by the output applied to their base and each conducts on opposite half cycles of the alternator output voltage.

The feedback control circuit which controls the impedance of the variable impedance $Z1$ includes a summing circuit 20 which is connected to a voltage detector means 22. The voltage detector means 22 detects a signal which is proportional to the voltage across the armature 16. The output of the voltage detector 22 is connected to apply the detected signal to an input of the summing circuit 20. Preferably, the voltage detector 22 detects the peak of the oscillating voltage and may be any of several such commonly known peak voltage detector circuits.

A reference signal source 24 is also connected to an input of the summing circuit to apply a control reference signal to the summing circuit. In the conventional feedback control manner, the difference signal from the summing circuit 20 is applied to a high gain amplifier 26 having its input connected to the output of the summing circuit 20 and applying its output to the control input of the variable impedance $Z1$. In accordance with conventional feedback control circuit principles, the feedback control circuit will vary the conductance $G1$ in proportion to the difference between the input of the voltage detector 22 and the output of the reference signal source 24.

Figure 2:
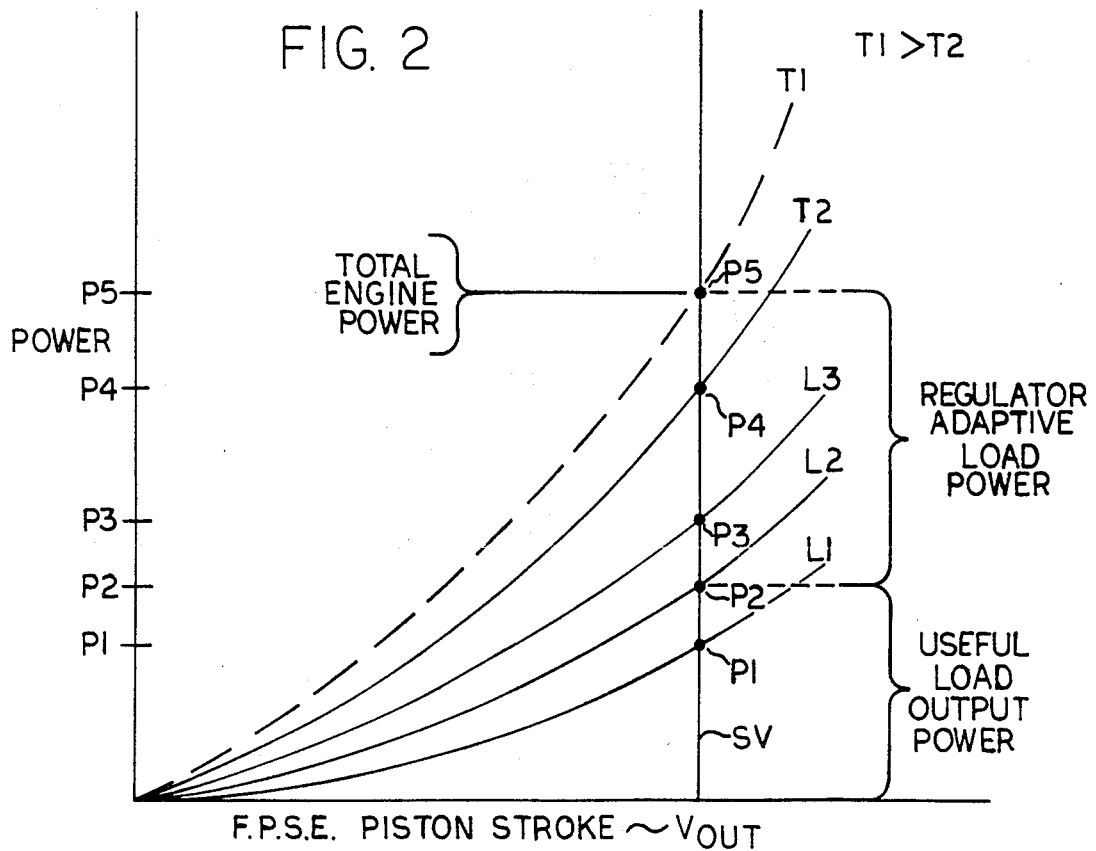
FIG. 2 is a graphical representation of the operation of the embodiment illustrated in FIG. 1.

The operation of the embodiment of FIG. 1 is illustrated in FIG. 2. As stated above, the output power from the free piston Stirling engine is proportional to the square of the piston stroke amplitude. The output voltage from the alternator is proportional to the piston stroke amplitude. Therefore, for a fixed useful load, load power is proportional to stroke squared. FIG. 2 illustrates a variety of square law curves which relate engine and load power to piston stroke amplitude and to voltage. Curves $T1$ and $T2$ represent two different engine power output curves for the free piston Stirling engine at two different operating temperatures. The temperature $T1$ is greater than the temperature $T2$. Curves $L1$, $L2$ and $L3$ illustrate the useful load output power as related to piston stroke amplitude or voltage for three different useful load impedances.

The useful electrical load and the Stirling engine would only have a theoretical equilibrium for a load curve essentially lying upon an engine curve. Any significant changes in the load or other operating parameters would result in the engine either oscillating beyond its limits or in stopping its oscillating.

With the addition of the invention illustrated in FIG. 1, the impedance of the controllably variable impedance Z1 is varied in order to shunt a variable current through the conductance G1 as the load imedpance or other parameters change so that essentially the identical current is always provided from the armature 16 and so that the voltage is maintained essentially constant. The stroke amplitude and voltage which is selected by design choice of the reference signal source 24 is illustrated by the nearly vertical line SV in FIG. 2. If the gain of the amplifier 26 were infinite the line SV would be vertical.

If the useful load 18 is disconnected from the circuit of FIG. 1 and the engine 10 is operating along curve T1, then the engine and alternator will operate at the equilibrium point identified as P5. Under that condition, all of the current from the armature 16 will be shunted through the variable conductance G1.

If, however, a load, such as that represented by the curve L2, is attached as the load 18, the current through the variable conductance G1 will be reduced by an amount equal to the current through the useful load 18 and the total armature current will remain essentially the same. The load will then operate at the power level indicated as P2 in FIG. 2. Under that condition, the useful load output power and the power in the regulator adaptive load variable conductance G1 will be divided as illustrated in FIG. 2 and will sum up to the power P5.

Of course, as the load power demand shifts, the curve of useful load vs stroke will also shift, for example, to P1 or P3 along curves L1 and L3. Similarly, if the operating parameters of the free piston Stirling engine vary, the operation may shift from point P5 on curve T1 to the point P4 on the curve T2 so that the total power delivered by the armature 16 may shift from P5 to P4.

Therefore, the system operates along the curve SV with the total armature output power operating on a family of curves for the free piston Stirling engine and the useful load power operating on a family of load power curves. If the useful load is removed, the entire power delivered by the armature 16 will be delivered to the controllable adaptive load G1 at the operating point P5, or a similar operating point along another member of the family of Stirling engine operating curves.

Figure 3:
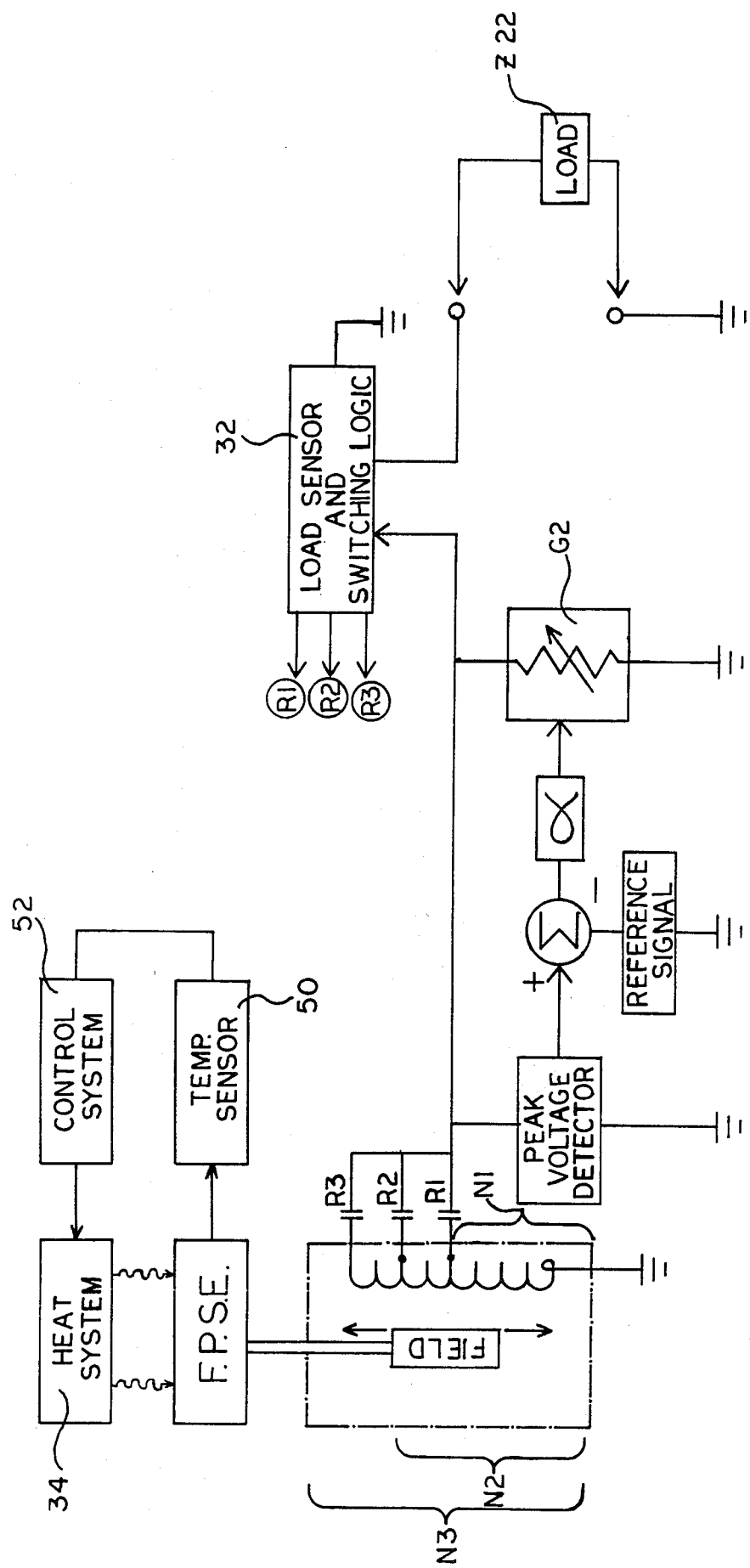
FIG. 3 is a schematic block diagram of the preferred embodiment of the invention utilizing both the adaptive load regulator and the stepped armature system for improving its operational efficiency.

FIG. 3 illustrates on embodiment like that of FIG. 1 but which has been modified to incorporate further improvements in the regulator system. In the embodiment of FIG. 3 the armature coil is divided into a plurality of serially connected coils by taps 30 and 31. More or fewer coils can be used but three is practical and convenient for illustration.

A sensing and switching circuit 32 is connected to the useful load Z22. It detects the steady state power demand of the useful load Z22 and includes logic circuitry to control the switching of relays R1, R2 and R3. The relay switches R1, R2 and R3 which can be any of the other various switching devices known to those skilled in the art, are connected to the taps of the armature and to the useful load. However, only one switch at a time is closed or made by the logic circuitry. When only switch R1 is closed, the least number of armature coil turns are included in the armature and therefore the maximum stroke amplitude would be utilized. This would correspond to rated power which is the highest level of power output expected from the armature.

However, if an intermediate range of power is demanded by the load, the switch R2 may be connected and switches R1 and R3 are disconnected so that more turns will be included within the armature. The inclusion of more turns will result in a reduced stroke amplitude which means a reduced power output for the free piston Stirling engine. If the power demand of the useful load Z22 is further reduced or the load is disconnected, the sensor and switching logic circuit 32 will disconnect switch R2 and make only switch R3 to provide the maximum number of armature turns for the lowest range of useful output power demand. In summary, the total effective number of armature coil turns is varied in steps in approximate inverse proportion to the square root of detected steady state power demand of the useful load Z22. However, the discrete steps are always greater than the useful power demand.

Figure 5:
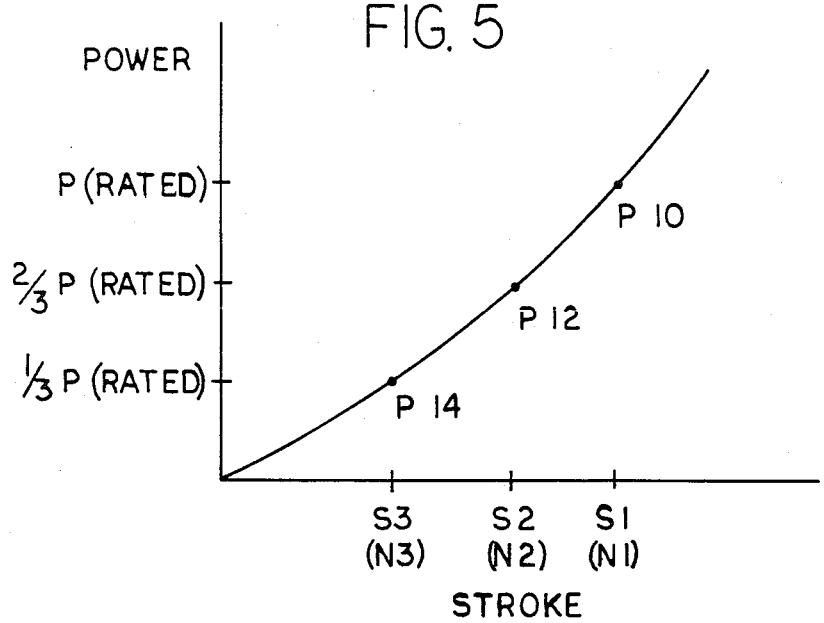

FIG. 5 illustrates the typical relationship between power from the armature or engine and stroke amplitude. For example, FIG. 5 illustrates three operating conditions, one at rated power, one at two-thirds of rated power and one at one-third of rated power. At rated power P10 the engine will have stroke S1 and the armature will utilize its basic winding of N1 turns. However, as the power demand of the useful load diminishes to two-thirds of rated power (i.e. P12), the stroke amplitude will be reduced to S2 and the armature will be increased to N2 total number of turns. Similarly, as the power is reduced to one-third rated power (i.e. P14) the stroke amplitude will be reduced to S3 and the number of turns will be increased to N3. Therefore, if the power demand is expressed by the equation:

$$P_d = x \, P_R \qquad \text{I.}$$

where $P_d$=power demand, $P_R$=rated power and where x represents a multiplier factor less than one, then the total number of turns $N_x$ of the armature winding should be:

$$N_x = \sqrt{1/x} \, N_R \qquad \text{II.}$$

$N_x > N_R$ since $x < 1$
where $N_R$ is the number of turns at rated power.

Figure 4:
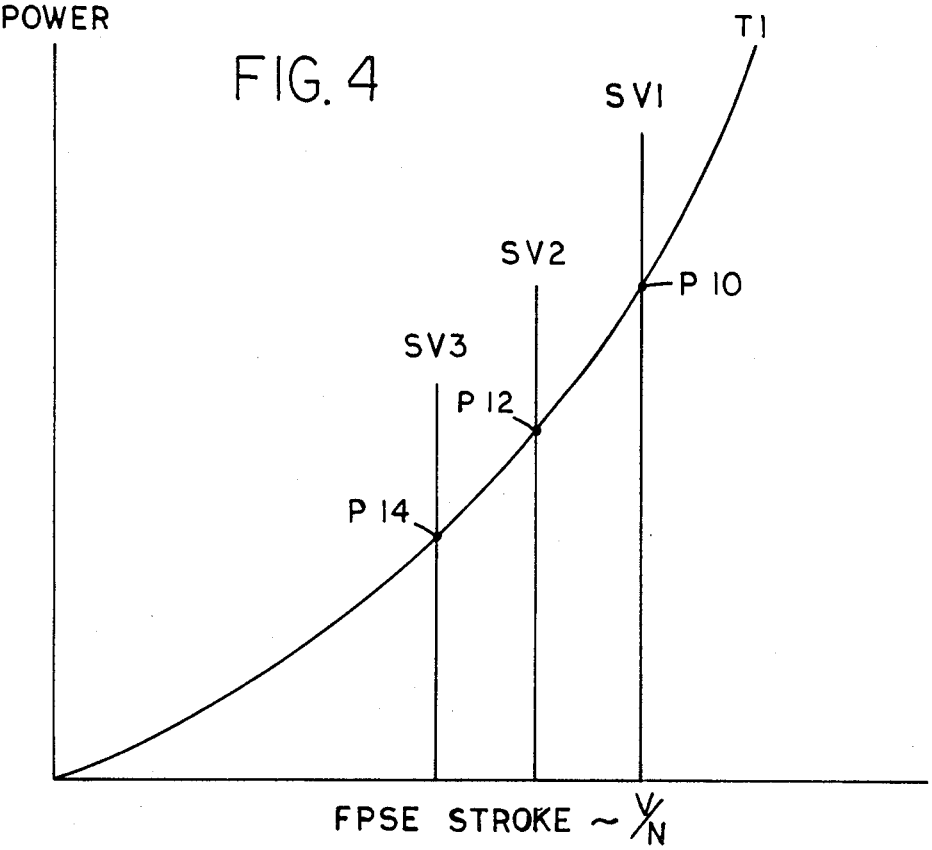

The operation of the embodiment illustrated in FIG. 3 may be explained in association with the curve of FIG. 4 which is analogous to those of FIG. 2. The Stirling engine may be brought to a temperature of T1, for example, with only the first winding N1 effectively connected as the armature. As this occurs, the stroke amplitude and the armature voltage will increase along the curve T1 until they reach the power P10. The power P10 is similar to the power P5 of FIG. 2. The power P10 is the total power from the armature which is divided between the useful load Z22 and the controllably variable adaptive load conductance G2 in the manner described in connection with FIGS. 1 and 2. This corresponds to the rated power at P10 of FIG. 5. So long as the useful load power is greater than a maximum selected intermediate power, such as for example two-thirds of the rated power indicated as P12, so that the useful load power is in an upper power range between P12 and P10, the total armature power will be operating at P10. That power will be divided between the adaptive controllable conductance G2 and the useful load Z22 so that the total power will operate along the maximum stroke amplitude indicated as the line SV1 in the manner explained in connection with the embodiment of FIGS. 1 and 2. Under that condition, the logic circuit of FIG. 8 will detect that the useful load power demand is greater than two-thirds of the rated power P10 and will maintain delay R1 in a made condition.

If the useful load power demand falls below two-thirds (i.e. P12) of rated power, but is above one-third of rated power (i.e. P14), the comparators of the logic circuit of FIG. 8 will switch on relay R2 and turn off relay R1. Under that condition, operation of the Stirling engine will fall along curve T1 to power level P12 illustrated on FIG. 4 and the total power delivered to and distributed between the controllable adaptive load conductance G2 and the useful load Z22 will be power P12.

In a similar manner, if the useful power demand of the load falls to P14 then the comparators of the circuit of FIG. 8 will detect that it has fallen below the next comparator level which will switch on relay R3 so that the maximum number of turns is effectively being used in the armature. In that sequence of events, operation will shift downwardly to SV3 and the power P14 will be distributed between the useful load Z22 and the adaptive controllable conductance G2 in the manner described above. So long as the power remains in the lower power range below P14, the circuit will operate in that manner with the impedance of the variable adaptive load G2 being varied so that the total electrical power consumed by the adaptive load G2 and the useful load Z22 remains at P14. Increases in the power demand of the useful load Z22 will cause corresponding switching of the armature windings in the opposite direction.

This step-wise shifting of the total power supplied by the armature is further illustrated in FIG. 6. FIG. 6 illustrates the discrete power intervals of total power from the armature as well as the ranges of useful load power over which the adaptive load operates within each interval. Thus, the linear curve in FIG. 6 represents the locus of load power operating points. The vertical distance from a load power operating point on the linear locus represents the distribution of the total armature power between the useful load Z22 and the controllable impedance Z2. The vertical distance below the locus represents the useful load power Z22 while the distance above it to the total armature power step represents the power absorbed by the adaptive controllable impedance Z2.

In addition to the switching of the armature coils in the manner described above in response to load power demand, these switchings will produce related changes at the thermal input to the Stirling engine. Each time a switching occurs to accomodate a lower useful load power demand, the Stirling engine will output less mechanical power corresponding to the reduced stroke amplitude. If heat energy continues to be applied to the hot end of the Stirling engine at the same rate, this will produce an increase in the temperature at the hot end. However, to accomodate this, a conventional thermal control system senses any small incremental temperature increase and reduces the heat energy applied in order to maintain the constant temperature. The temperature is sensed by a temperature sensor 50 which applies the sensed temperature to a control system 52 which is in turn connected to the heat source 54. Since the thermal control system is a conventional prior art feedback control system commonly used with free piston Stirling engines, it is not described in further detail and is analogous to the thermal control in a dwelling.

The effective number of armature coil turns is controllable by selection of taps and therefore is limited to a set of discrete numbers of turns. As a result, stroke amplitude and power output from the alternator can only operate at discrete levels. Therefore, it is necessary to have some kind of variable energy absorber connected with the stepped armature if it is desired to accomodate engine parameter changes and intermediate useful load levels which are not precisely at the discrete total armature power levels.

The adaptive controllable conductance G2 in the electrical circuitry of the armature is such a variable energy absorbing device and is preferred. It can be appreciated, however, that other types of variable energy absorbing devices can be used with the stepped armature system. For example, a separate energy absorbing braking system, such as a mechanical or electromagnetic brake which is continuously variable over a range of power absorption, could alternatively be used.

Furthermore, for multiphase power systems, multiples of the circuitry illustrated can be used.

The above description of the operation of the stepped armature circuitry is directed principally to the steady state operation at the different power levels. However, further consideration must be given to the transitional conditions and the instability that can result. This instability can be prevented by a variety of different systems.

If the load sensor and switching logic 32 of FIG. 3 respond to the instantaneous power applied to the useful load Z22, a problem arises. If it did, when it detected a useful load power below the next lower power level and therefore initiated switching of the armature coil to the next higher number of armature turns, the piston stroke amplitude would not instantaneously be reduced because of its inertia. Time is required for the free piston Stirling engine to settle down to the reduced stroke amplitude. Therefore, an instantaneous switching to more turns would initially induce an increased voltage or the armature and applied to the load Z22 because the stroke amplitude would instantaneously remain the same. This would increase the power applied to the load Z22 which in turn would be detected by the load sensor and switching logic 32 and call for another switching back to the lower number of armature turns. As a result, a hunting or oscillating instability would occur in which the circuit switched between the two levels.

One simple means of avoiding the problem would be to use conventional circuitry concepts to prevent any switching for a selected time delay after each switching of the armature coil. The selected time delay would be sufficiently long for the particular Stirling engine that stability at the new power level would be assured.

Preferably, however, another type of conventional circuitry is utilized to provide a detector 60, illustrated in FIG. 8, which instantaneously detects the real part of the load impedance. Changes in the real part of the load impedance are directly proportional to changes in its steady state useful load power demand and therefore can be used with a suitable proportionality constant to detect a signal which is applied to the comparators 62 and 64 of FIG. 8. That signal determines the power demand level at which the armature is called upon to operate. Since the output voltage V is kept essentially constant in all operation, this circuit in effect determines the power which the useful load will demand after the transition has occurred to a steady state operation, and is not subject to discontinuities at the power switching points, hence is not subject to hunting.

While certain preferred embodiments of the present invention have been disclosed in detail, it is to be understood that various modifications may be adopted without departing from the spirit of the invention or scope of the following claims.

What is claimed is:

1. An adaptive load regulator for a linear alternator driven by a free piston Stirling engine, having a heat energy source, the alternator having an armature circuit and a useful load connected to the armature circuit, and further including a stepped armature system for controlling the stroke amplitude of the Stirling engine, the regulator and the stepped armature system comprising:
   (a) a controllably variable conductance shunted across the armature;
   (b) a negative feedback control circuit comprising:
      (i) a summing circuit;
      (ii) a voltage detector means connected to the armature circuit for detecting a signal which is proportional to the alternator output voltage and connected to apply the detected signal to an input of the summing circuit;
      (iii) a reference signal source connected to apply its reference signal to another input of the summing circuit; and
      (iv) an amplifier having its input connected to the output of the summing circuit and its output connected to the control input of the controllable, variable conductance for applying a signal which is proportional to the difference of the input signals at the summing circuit to a control input of the variable conductance for varying the conductance in proportion to detected voltage changes;
   (c) an armature coil divided into a plurality of coils serially connected by one or more taps;
   (d) circuit means having an input connected to the useful load for detecting the steady state output power demand of the useful load; and
   (e) logic switching means having a control input connected to the output of the power demand detecting means and having its switches connected to the taps of the armature and to the useful load for connecting a selected one of said taps as the armature output to the useful load to provide an effective total number of armature coil turns in inverse proportion to the square root of a selected, discrete total armature power output above the detected steady state power demand of the useful load;
   whereby the stroke is changed to discrete stroke amplitudes in approximate inverse proportion to the square root of the useful load power demand.

2. A regulator in accordance with claim 1 wherein the voltage detector is a peak detector.

3. A regulator in accordance with claim 2 wherein said amplifier is a high gain amplifier.

4. An improved regulator in accordance with claim 1 wherein the steady state output power demand detector comprises means for detecting the instantaneous real part of the useful load impedance.

5. A stepped armature regulator for a linear alternator driven by a free piston Stirling engine, the alternator having an armature circuit and a useful load connected to the armature circuit, the regulator comprising:
   (a) an armature coil divided into a plurality of coils serially connected by one or more taps;
   (b) circuit means having an input connected to the useful load for detecting the steady state output power demand of the useful load;
   (c) logic switching means having a control input connected to the output of the power demand detecting means and having its switches connected to the taps of the armature and to the useful load for connecting a selected one of said taps as the armature output to the useful load to provide an effective total number of armature coil turns in inverse proportion to the square root of a selected, discrete total armature power output above the detected steady state power demand of the useful load, whereby the stroke is changed to discrete stroke amplitudes in approximate inverse proportion to the square root of the useful load power demand;
   (d) a controllably variable energy absorbing load having a control input and connected to absorb energy from the Stirling engine; and
   (e) a feedback control having an input connected to detect a signal proportional to the engine stroke amplitude and an output connected to the control input of the energy absorbing load to vary the energy absorption of the controllable load in inverse proportion to detected stroke amplitude changes from a selected reference stroke amplitude.

6. A regulator in accordance with claim 5 wherein the detected signal which is proportional to stroke amplitude is the armature voltage.

7. An improved regulator in accordance with claim 6 wherein the steady state output power demand detector comprises means for detecting the instantaneous real part of the useful load impedance.

8. A regulator in accordance with claims 1 or 5 and further comprising a thermal feedback control system connected to detect the heat source temperature applied to the free piston Stirling engine and adjust energy input to maintain a selected reference temperature.

9. A method for controlling the stroke amplitude of a linear alternator connected to a free piston Stirling engine having an armature coil connected to a load, the method comprising:
   (a) forming the armature coil as a plurality of series connected coils by one or more taps;
   (b) switching a number of the series coil turns in connection to the load approximately in inverse proportion to the square root of the steady state power demand of the useful load.

10. A method in accordance with claim 9 further comprising:
   (a) shunting a portion of the armature output current of the alternator through a variable impedance; and
   (b) varying said impedance in proportion to changes in the output voltage of the alternator from a selected output voltage.

11. A method in accordance with claims 9 or 10 further comprising the step of maintaining the input temperature applied to the free piston Stirling engine substantially at a selected temperature.

* * * * *